Aug. 20, 1946. R. J. ANDERSON Re 22,781

AUTOMATIC BREAD TOASTING APPARATUS

Original Filed Oct. 20, 1937 7 Sheets-Sheet 1

Inventor:
Roy J. Anderson,
By: Arthur W. Nelson
Attorney.

Aug. 20, 1946. R. J. ANDERSON Re 22,781

AUTOMATIC BREAD TOASTING APPARATUS

Original Filed Oct. 20, 1937 7 Sheets-Sheet 2

Inventor:
Roy J. Anderson,
By: Arthur W. Nelson
Attorney.

Aug. 20, 1946. R. J. ANDERSON Re 22,781

AUTOMATIC BREAD TOASTING APPARATUS

Original Filed Oct. 20, 1937 7 Sheets-Sheet 3

Inventor:
Roy J. Anderson,
By: Arthur M. Nelson
Attorney.

AUTOMATIC BREAD TOASTING APPARATUS

Original Filed Oct. 20, 1937 7 Sheets-Sheet 4

Inventor:
Roy J. Anderson,
By: Arthur M. Nelson
Attorney.

AUTOMATIC BREAD TOASTING APPARATUS

Original Filed Oct. 20, 1937 7 Sheets-Sheet 5

Inventor:
Roy J. Anderson,
By: Cadwallader Nelson
Attorney.

AUTOMATIC BREAD TOASTING APPARATUS

Original Filed Oct. 20, 1937 7 Sheets-Sheet 6

Inventor:
Roy J. Anderson,
By: Arthur M. Nelson
Attorney.

Aug. 20, 1946. R. J. ANDERSON Re 22,781

AUTOMATIC BREAD TOASTING APPARATUS

Original Filed Oct. 20, 1937 7 Sheets-Sheet 7

Inventor:
Roy J. Anderson,
By: Cadwallader Wilson
Attorney

Reissued Aug. 20, 1946

Re. 22,781

UNITED STATES PATENT OFFICE 22,781

AUTOMATIC BREAD TOASTING APPARATUS

Roy J. Anderson, Chicago, Ill., assignor, by direct and mesne assignments, to Chicago Flexible Shaft Company, Chicago, Ill., a corporation of Illinois Original No. 2,165,204, dated July 11, 1939, Serial No. 170,065, October 20, 1937. Application for reissue July 10, 1941, Serial No. 402,556

22 Claims. (Cl. 219—19)

This invention relates to improvements in automatic bread toasting apparatus and it consists of the matters hereinafter described and more particularly pointed out in the appended claims.

Bread toasters as now made are open to certain objections which the present invention seeks to overcome. Such toasters usually include a depressible lever or the like for setting the toaster in operation and which lever is relatively hard or stiff to operate. Thus, in establishments serving large numbers of slices of toast, the depressing of such levers many times a day is indeed a tiresome task for the operator and much time is consumed therein, which could be used for other duties.

One of the objects of the present invention is to provide apparatus of this kind which may be set into operation merely by the touch of the finger and which apparatus may be manipulated so that the toast may be ejected automatically or may be retained in toasting position for a longer time and then ejected at the will of the operator.

Another object of the invention is to provide a bread toasting apparatus which may be built into a table or counter and the like so as to be flush with the top surface thereof and at the same time be devoid of projecting levers and other parts, liable to cause injury to operators passing the same and damage to the mechanism of the apparatus.

A further object of the invention is to provide an apparatus of this kind which is so constructed as to permit the addition of other sections as the occasion demands, without requiring separate driving means for the timing mechanism of the individual sections added.

A further object of the invention is to provide a toaster apparatus of this kind which may be produced at a lower cost in that it eliminates expensive finished casings by reason of the flush arrangement with the top of the supporting member in which it is installed.

Again, it is an object of the invention to provide a toasting apparatus which includes electric motor driven means for the timing mechanism thereof, whether the apparatus includes one or more sections.

Again, it is a further object of the invention to provide a toasting apparatus which operates automatically to change the "on" periods of the source of heat to meet the situations of starting a toasting operation either from a cold condition of the apparatus to a heated condition thereof following a previous toasting operation.

Another object of the invention is to provide an automatic bread toasting apparatus in which the bread slices are automatically toasted in recurrent cycles of operation each started by the operator and in which a selective control is provided whereby at the end of each toasting interval the toasted bread may be ejected automatically or it may be retained in the toasting position for a longer time and then ejected at the will of the operator.

The above mentioned object of the invention, as well as others, together with the several advantages thereof will more fully appear as the specification proceeds.

In the drawings:

Fig. 1 is a perspective view of the improved bread toasting apparatus when including more than one section, as the same appears in position upon a support such as a counter top or the like.

In general, the invention contemplates an apparatus embodying therein at least a single apparatus section including motor driven timing mechanism for determining not only the length of the bread toasting period but also for ejecting the finished toast at the end of said period. Said apparatus section, which is intended to have its top arranged flush with the top surface of a support such as a service or like counter, is so constructed that other sections, each including a timer mechanism, may be added and operatively connected to the first section and may be driven from the motor in the first section. Each section includes mechanism whereby the bread to be toasted may be caused to be moved into toasting position by only a slight finger pressure amounting to a mere touch, so that the effort required in manipulating the apparatus is so small as to be negligible.

Figure 1:
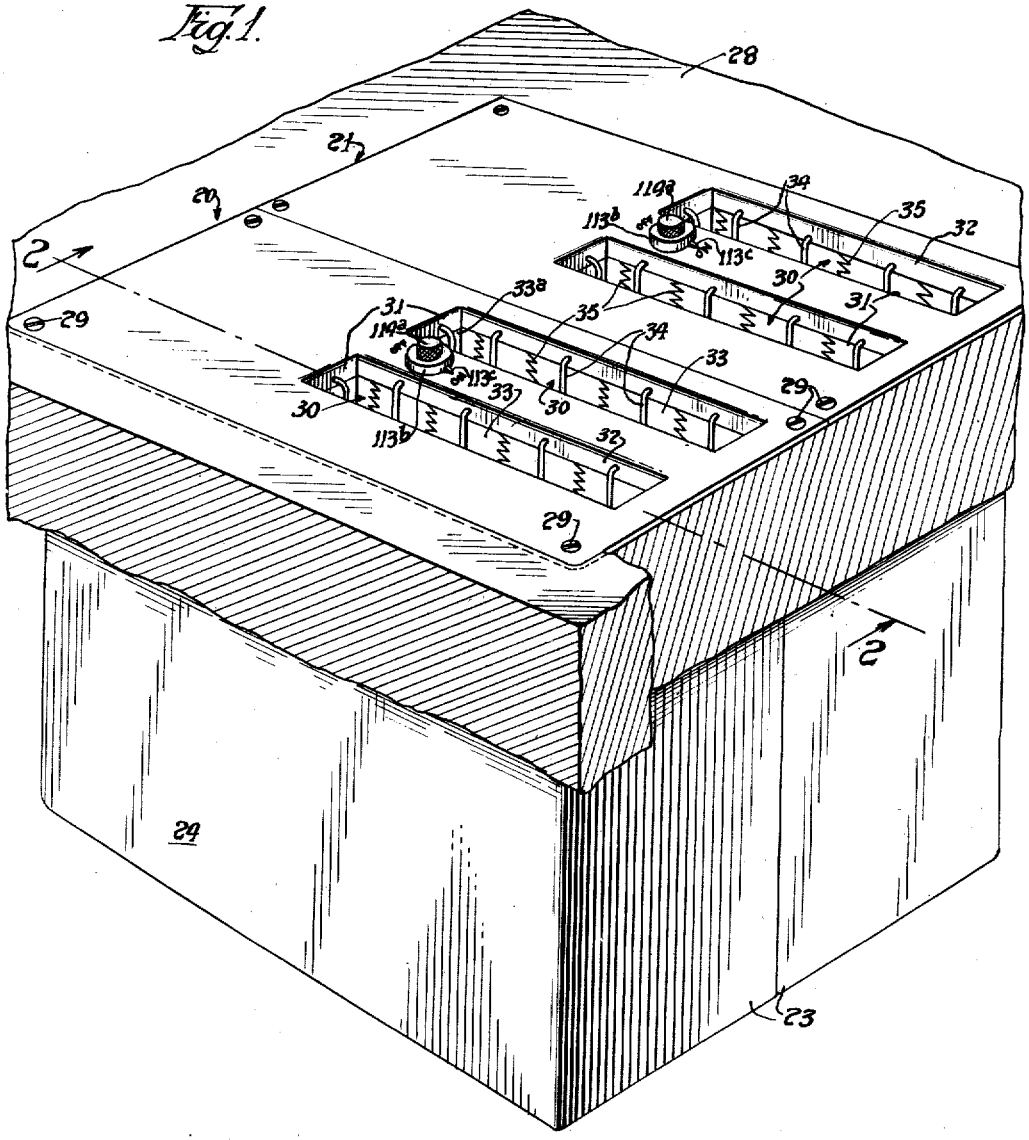

In Fig. 1 the apparatus is illustrated as including two sections 20 and 21 respectively, the former being the primary section and including an electric motor for driving the timing mechanism driving shaft thereof and the latter being the secondary section and including timing mechanism which may be connected to the driving shaft of the primary section so as to be driven thereby. Thus, as the demands require more capacity so far as toasting operations are concerned, other sections may be added so that the timing mechanism thereof may be driven from or by the motor in the primary section. With the exception of including a motor, the secondary and later added sections are substantially the same in construction as the primary section so that a detail description of one section will suffice for both.

Each section includes a casing comprising front and rear end walls 22—23, a pair of side walls 24—24, a bottom wall 25 and a top cover plate 26. Such a casing is adapted to set in an opening 27 in a support as for instance a counter top 28, the end walls being flanged outwardly for attachment to said support. Preferably the top cover plate overlaps the flanges of the ends walls and screws 29 extend down through corner portions of the cover plate into the support 28 to secure the section in place.

Toward the rear end of the casing is a pair of laterally spaced toasting chambers or ovens, each indicated as a whole as at 30, each oven including a bread slot 31 that opens at the top through the cover plate. The front, rear and sides of each slot are defined by depending flanges 32. Plates **33—33*a* depend from the flanges 32 at the sides of the front end of the slots. At the sides and ends of each slot are depending guard bars 34 and supported from each plate 33, outside the guard bars 34 are electrical heating elements 35 suitably insulated from not only the plates 33, but from the casing and cover plate. The plates 33—33*a* coact with the rear wall 23 in concentrating the heat from the heating elements 35**, in the respective chambers or ovens.

Figure 3:
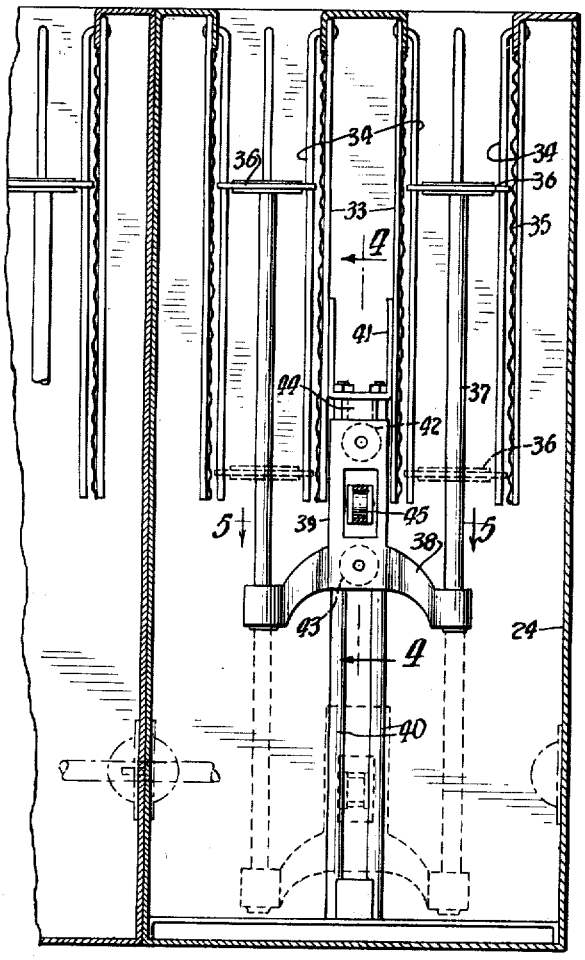
Fig. 3 is another vertical sectional view through the bread receiving and toasting parts of the apparatus as taken on the line 3—3 of Fig. 2.
Figure 4:
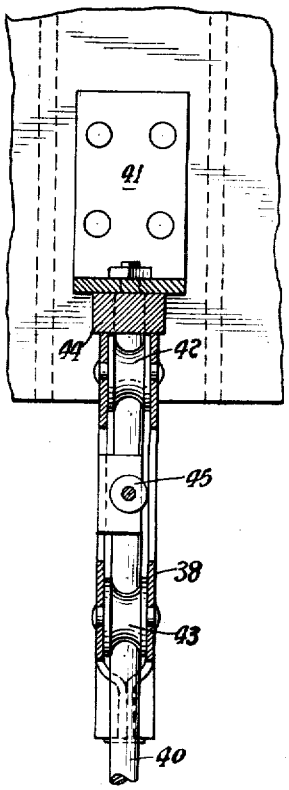
Fig. 4 is a vertical detail sectional view on an enlarged scale through certain of the parts appearing in Fig. 3 as taken on the line 4—4 of Fig. 3.
Figure 5:
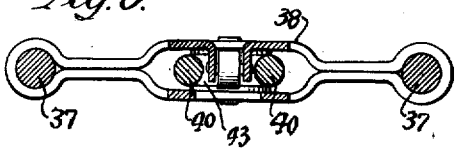
Fig. 5 is a horizontal detail sectional view through parts shown in Fig. 3, as taken on the line 5—5 of Fig. 3.

In each toasting chamber or oven is a bread support 36 having openings in its margins through which the bars 34 extend to provide a guide for the support in its downward and upward movement in the toasting chamber from a bread receiving position to a bread toasting position. Each bread support is centrally mounted upon the top end of an upright raising and lowering bar 37. The bars 37 in the pair of toasting chambers are secured at their bottom end to a cross head 38. This cross head is supported from a carriage 39 that has sliding guided bearing upon a pair of posts 40 rising from the bottom of the casing and anchored at the top end in a bracket 41 as appears in Figs. 3 and 4. This bracket is secured to adjacent plates 33 of the pair of toasting chambers in each section as appears in Fig. 3. The carriage 39 carries top and bottom rollers 42 and 43 respectively that engage opposite sides of the guide posts 40 and a stop 44 is provided on the bracket 41, between the posts 40—40, to be engaged by the carriage 39 to limit the upward movement thereof in providing the bread receiving position for the bread supports 36.

The carriage 39 is open at a point between the rollers 42—43 and is arranged to support a third roller 45 with its axis disposed in a horizontal plane passing through the axes of both posts. This roller is adapted to be engaged by the bifurcated end of a certain lever mechanism as will later appear, and in one instance receiving movement therefrom for raising the carriage and in another instance imparting movement to said lever to trip the same, as will later appear. The movement of the bread support 36 before mentioned, is such that when it is in its "down" or toasting position, as indicated in dotted lines in Figs. 2 and 3, the bread slices 46 are entirely within the toasting chamber or oven so as to be toasted by the action of the elements 35. When the support 36 is in its "up" or bread receiving position, as shown in full lines in Figs. 2 and 3, the upper part of the bread slices project a considerable distance above the top plate 26 for easy grasping for removal. In the movement of the bread supports from one position to the other, the bars 34 prevent contact of the bread slices with the heating elements 35.

Figure 2:
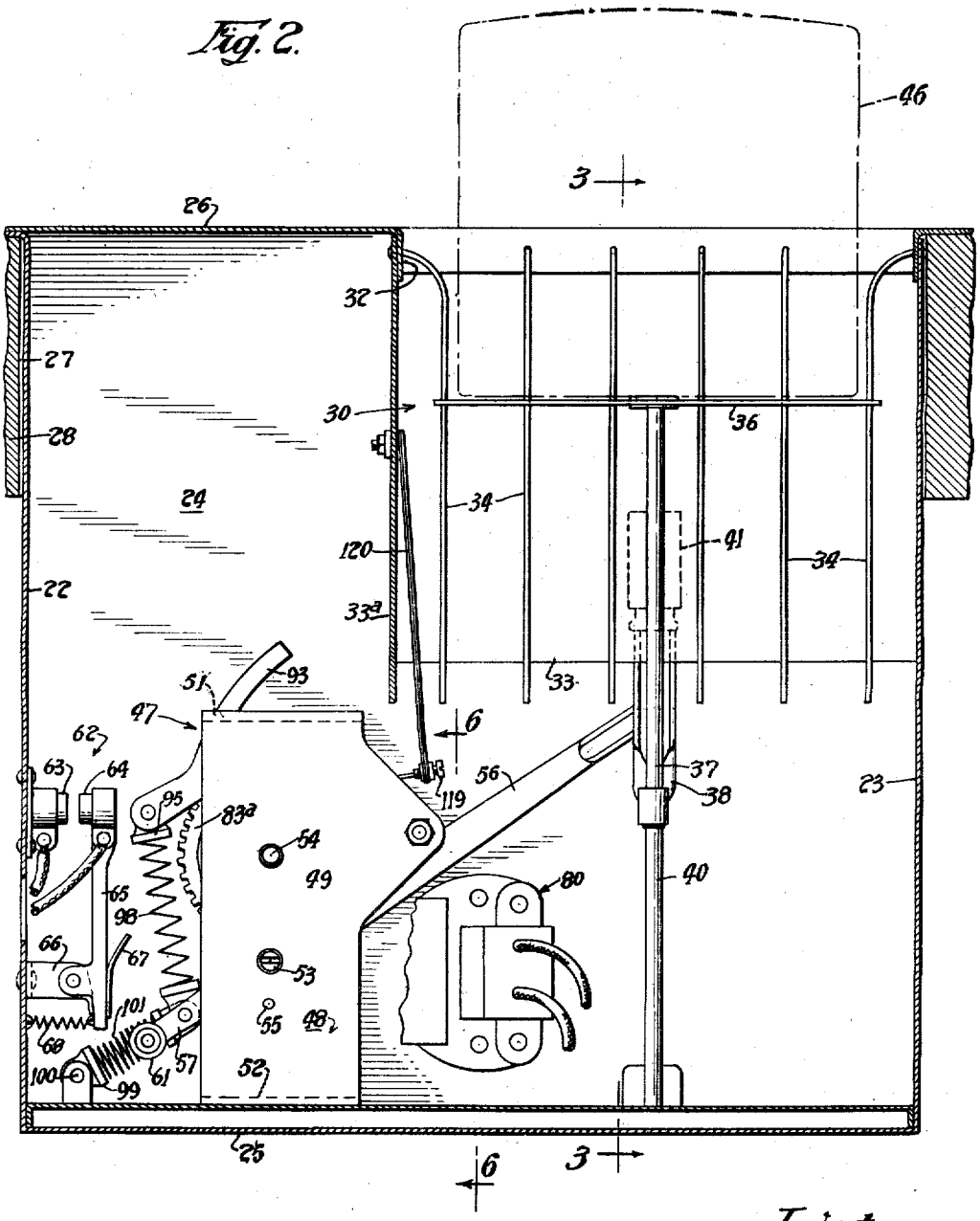
Fig. 2 is a vertical sectional view on a somewhat enlarged scale through one of the sections of the toaster appearing in Fig. 1 as taken on the line 2—2 of Fig. 1.

A timer mechanism indicated as a whole at 47 in Fig. 2 is disposed in the casing toward the front end thereof at the bottom and in a plane about midway between the plane of the toasting chambers. Such a mechanism includes an upright rectangular frame 48 that is open at its front and rear and includes upright side walls 49 and 50 respectively, a top wall 51 and a bottom wall 52. A horizontally disposed timer driving shaft 53 is journalled in the side walls of 49 and 50 and a timer wheel shaft 54 is likewise journalled in said side walls above the driving shaft. A tie rod 55 arranged below the shaft 53 further connects the side walls 49 and 50 together. The said shafts and tie rod are all disposed in the same vertical plane.

Figure 6:
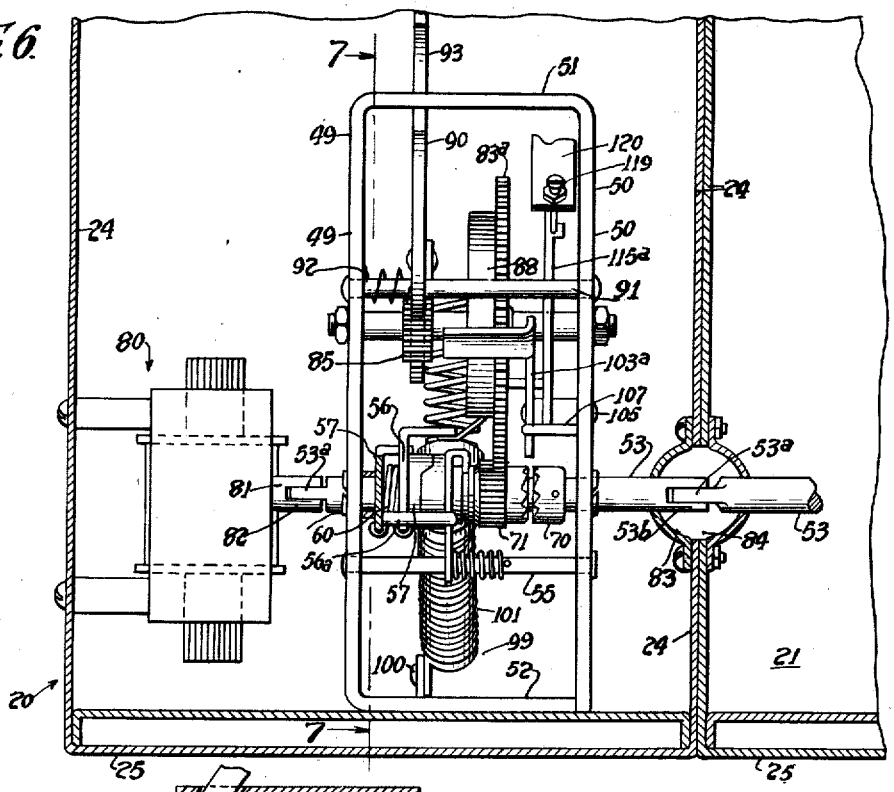
Fig. 6 is a detail vertical sectional view on a further enlarged scale through a part of the timer mechanism included in the improved toasting apparatus, as taken on the line 6—6 of Fig. 2.

One end of a relatively long lever arm 56 is journalled on the driving shaft 53. The other end of this lever arm is bifurcated to engage the roller 45 of the carriage 39. One end of a relatively short lever arm 57 is also journalled on said shaft 53 adjacent the lever arm 56 as best appears in Figs. 6 and 11 and said end of the lever arm 57 carries a hub cam 58. The hub end of the arm 56 is formed with a lateral extension 59 that overhangs a part of the top edge of the lever arm 57 and limits the relative pivotal movement of said arms in one direction. A spring 60 is coiled about the shaft 53 between the associated ends of said arms and the ends of said spring have a hooked engagement with parts of the bottom edges thereof. This spring normally operates to hold both arms 56 and 57 together as a lever by reason of the engagement of the extension 59 in its engagement with the lever arm 57 but permits a relative pivotal movement between the arms, when a force is applied to either arm which overcomes the holding action of the spring 60.

The free or outer end of the arm 57 carries a roller 61 adapted in the movement of the arm from one position to another and back to the first position, to actuate a switch mechanism 62 (see Fig. 2) which controls the energization and the deenergization of heating elements 35. As shown herein, said mechanism includes a fixed contact 63 mounted on the front wall 22 of the casing. Associated therewith is a movable contact 64 carried by the top end of an arm 65 pivoted on a bracket 66 also secured to said front wall. A cushion spring 67 which is carried by said arm, is disposed in the path of movement of the roller 61 on the arm 57. When said arm swings clockwise upwardly as appears in Fig. 2, the roller 61 engages the spring 67 to swing the arm 65 to a position wherein the contact 64 engages the contact 63 and closes the circuit to the heating elements 35. When the lever arm 57 is in the position shown in Fig. 2, a spring 68 so operates on the arm 65 as to take the contact 64 out of engagement with the contact 63 whereby the circuit to the heating elements is broken.

A clutch element 70 (see Fig. 11) is fixed to the shaft 53 near the side wall 50 of the frame for the timer mechanism. Loose on and laterally shiftable of the shaft 53 between the clutch element 70 and the lever arm 57 is a pinion 71, one end of which is made as a clutch element 72 to coact with the element 70. The other end of said pinion is formed with an annular groove 73 therein in which one end of a shifter yoke 74 engages, the other end of said yoke being bifurcated as at 75 to straddle the tie bar 55. A cam element 76 is carried by the yoke for cooperation with the cam element 58 before mentioned. The cam elements 58 and 76 are formed with clutch-like interengaging cams so that when the cam element 58 is turned in one direction upon the shaft 53, said cam elements coact to cause the pinion 71 to move on the shaft 53 toward the clutch element 70. This movement is against the action of a spring 77 on the tie rod 55 between the yoke 74 and a pin 78 on said tie rod. The cam elements before mentioned are best shown in Figs. 11 and 12 respectively.

When the pinion 71 has been so moved toward the clutch element 70, the clutch teeth 72 on said pinion engage the clutch element so that the pinion is operatively connected to the shaft 53 so as to be driven thereby. It is pointed out that by means of the shifter yoke 74, the cam element 76 is non-rotative with respect to the shaft 53 and may move longitudinally of the shaft along with the pinion 71. From an inspection of Fig. 11, it is apparent that the spring 77 through the yoke 74 tends to move the pinion 71 along the shaft 53 away from the clutch element 70 so that the pinion is normally disconnected from the shaft 53. When said pinion is so disconnected from the shaft, the shaft 53 may rotate continuously without exerting any driving effect on the pinion 71.

Figure 11:
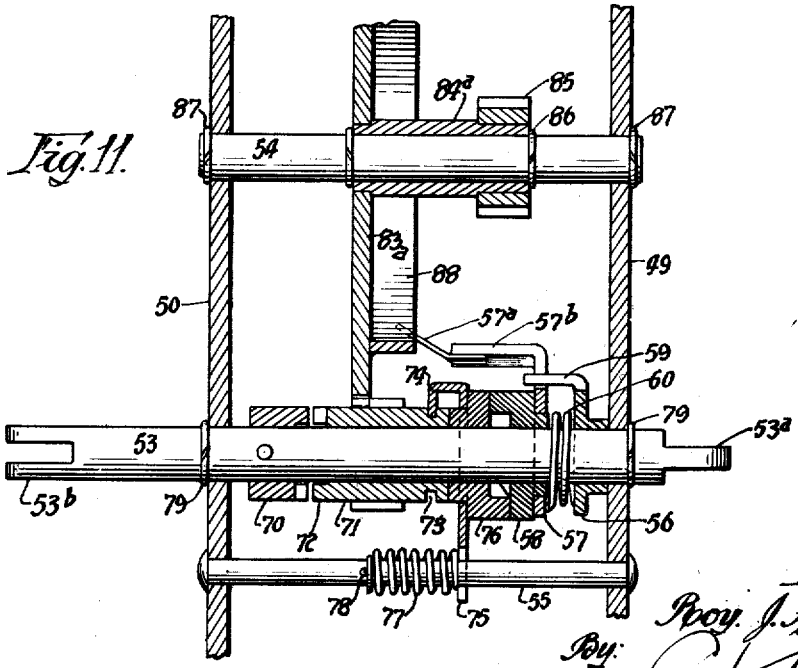
Fig. 11 is a detail vertical sectional view on an enlarged scale as taken on the line 11—11 of Fig. 10.
Figure 12:
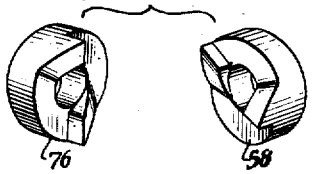
Fig. 12 is a perspective view of a pair of associated clutchlike cam elements embodied in the timing mechanism of the apparatus and which will be more fully referred to later.

The shaft 53 is normally held against endwise shifting in the side walls 49 and 50 of the timer mechanism frame 48 in any suitable manner such as by the locking rings 79 as appears in Fig. 11. Said shaft may be driven in any suitable manner. As shown herein, an electric motor 80 is secured to one wall of the casing of the primary section 20. This motor, through gear reduction therein, drives a shaft 81 arranged in axial alignment with the shaft 53. The shaft 81 is bifurcated at its end as at 82 to receive a tongue 53a on the shaft 53, all as appears in Fig. 6. The opposite end of the shaft 53 which is bifurcated as at 53b has bearing in a bracket 83 on the associated side wall 24 of the casing and extends into an opening 84 provided therefor in said side wall. Thus when a secondary section 21 is to be added to the primary one 20, the tongue 53a of the shaft 53 of the secondary section is engaged with the bifurcated end 53b of the shaft 53 of the primary section so that the shafts of both sections are operatively but detachably connected together in driving relation. In this manner only the primary section need be provided with a motor 80, the other sections later added merely having their timer driving shafts 53 coupled to each other and to the like shaft of the primary section, as will be apparent from Fig. 6.

83a indicates the main gear of the timing mechanism which is journalled on the shaft 54 previously mentioned and which gear is normally in mesh with the pinion 71. This gear has a relatively long hub 84a which extends toward the side wall 49 of the timer frame and carries a pinion 85 on its end. Locking rings 86 prevent endwise movement of the gear 83a and its pinion and hub on the shaft 54 and other locking rings 87 to prevent endwise movement of the shaft 54 with respect to the side walls 49 and 50 of the timer frame. A substantially semi-circular shroud or flange 88 is provided on that side of the gear 83a facing the pinion 85 and said shroud, when said gear is driven in one direction, is adapted for engagement with a spring finger 57a carried by a lateral extension 57b on the lever arm 57 (see Fig. 11) for a purpose later to appear.

A lever 90 is disposed between the side walls 49 and 50 of the timer frame and substantially in the plane of the pinion 85. This lever is pivoted at one end upon a cross pin 91 secured at its ends in the side walls of the timer frame. A spring 92 surrounds one end of said shaft and said spring is so connected to one of the side walls 49—50 of the timer frame and to said lever as to tend to swing said lever clockwise. This arrangement best appears in Fig. 10. The lever 90 carries an arcuate extension 93, concentric with the pin 91 and this extension slides through an opening 51a in the top wall of the timer frame. This extension operates as a guide so that the lever moves true in its swinging movement. The lever 90 also carries an arcuate rack extension 94 concentric with the shaft 91 and normally meshing with the pinion 85. The free end of the lever 90 carries a pivotal spring abutment 95.

The lever arm 57 carries a pair of pivoted abutments 96 and 97 and between the abutments 95 and 96 is a helical expansion spring 98. A similar spring abutment 99 is pivoted at 100 with respect to the bottom wall of the casing and between the abutments 97 and 99 is a helical expansion spring 101.

Figure 13:
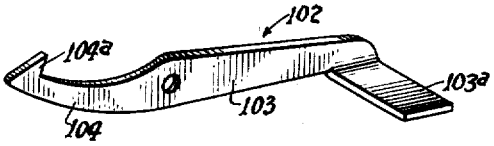
Fig. 13 is a perspective view of a certain stop and trip arm embodied in the toaster apparatus and which will also be more fully referred to later.

A lever 102 shown in perspective in Fig. 13 and including a pair of lever arms 103 and 104 respectively is arranged in a plane between the timer gear 83 and the side wall 50 of the timer frame and this lever is pivoted as at 105 on said side wall. The arm 103 is formed at its free end with a lateral extension 103a which extends into the path of a stud 56a on the lever arm 56. The other arm 104 of said lever 102 carries an upwardly facing hook 104a adapted under certain instances, to be engaged by a stud 106 projecting laterally from that face of the gear 83a opposite the shroud 88. A pin 107 which projects laterally inward from one of the side walls of the timer frame forms a stop adapted to be engaged by the arm 103 of the lever 102.

Figure 10:
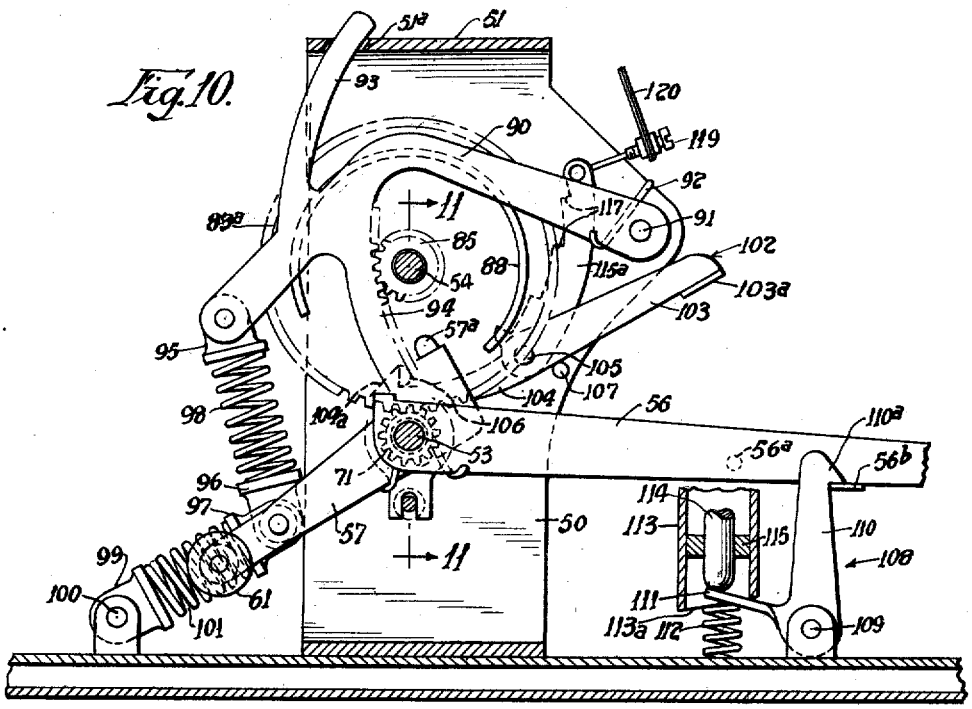
Fig. 10 is a view similar to Fig. 9 with certain of the parts in a still further changed relation.

108 indicates a bell crank-like latch lever pivotally mounted as at 109 with respect to the bottom wall of the casing, as best appears in Fig. 10. This latch lever, which is arranged in a plane spaced laterally from the plane of the lever arm 56, includes a pair of arms 110 and 111 respectively, the former including a top end hook 110a adapted for engagement with or by a laterally extending lug 56b of the lever arm 56. A helical expansion spring 112 is disposed between the bottom wall of the casing and the other arm 111 of said latch lever and normally tends to swing the latch lever as a whole clockwise as appears in said Fig. 10. When said latch lever 108 is in one position its hook 110a is adapted to engage the lever arm extension 56b to lock the lever arm in that position, as appears in Fig. 10 and which position provides the bread toasting position for the bread supports 36. When the latch lever is held in its other position, as shown in full lines in Fig. 8, the hook 110a is out of the path of the lever arm extension 56b so that said latch lever is ineffective to engage the extension 56b of said lever.

Figure 8:
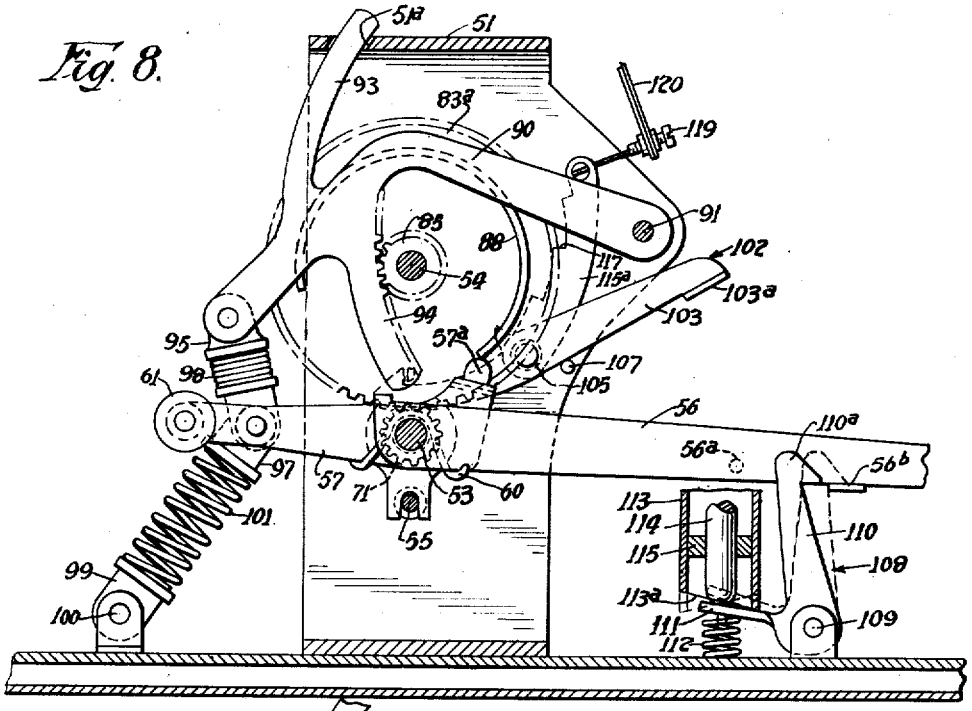
Fig. 8 is a view similar to Fig. 7 with certain of the parts of the timing mechanism in changed relation.

To hold the latch lever 108 in its ineffective position as shown in Fig. 8, I provide an upright tubular member 113 arranged axially with the spring 112. The bottom end of said member is cut obliquely to provide a cam 113a on said end, a portion of the edge of which rides on the lever arm 111. The top end of said member, which is rotatively journalled in the top plate 26 of the casing is provided with an annular head 113b carrying a pointer 113c to coact with "on" and "off" indicia provided on said top plate as shown in Fig. 1. By turning the member 113 through 180°, the "high" spot of the end 113a or the "low" spot thereof, may be caused to engage the latch lever arm 111 to swing the latch lever from one to the other of its positions as before mentioned.

When the "low" spot of said end 113a is engaged with said latch lever arm, as appears in Fig. 8, the latch lever 108 is in its ineffective position with respect to the extension 56b as appears in Fig. 8. When the "high" spot on said end 113a is engaged with the latch lever arm, the latch lever is in its effective position with respect to said extension 56b. When the latch lever is in this last mentioned position and the hook 110a thereof is in engagement with the said extension 56b, it is possible to release said extension by the following arrangement.

Axially in the tubular member 113 is a rod 114 which has sliding bearing in shoulders 115 provided therefor in said tubular member, but only one of which appears in the drawings as in Fig. 10. The bottom end of said rod 114 normally engages upon the lever arm 111 while the top end of said rod is made as a knob 114a that extends somewhat above the annular head 113b of the tubular member 113. When the latch lever 108 is in the position shown in Fig. 10 wherein it locks the lever arm 65 against upward movement, a slight downward pressure on the knob 114a, will cause the latch lever 108 to swing counter-clockwise, to withdraw the hook 110a from locking engagement with the lever arm extension 56b so that the lever arm 56 is released to swing upwardly. The purpose of the tubular member 113 and the rod 114 will appear later.

115a (see Fig. 8) indicates a member which is movable in response to the temperature in the toasting chambers or ovens for controlling or timing the return movement of the timing wheel or gear 83a and whereby after one toasting operation, the duration of time for the next operation is controlled. Thus, through this member it is possible to compensate for the condition of starting with a "cold" apparatus or one of relatively high temperature such as occurs when immediately starting a second toasting operation after a first or previous one.

The member 115a, which is in the form of a lever disposed in a plane between the wheel 83a and the side wall 50 of the timer frame, is pivoted at its bottom end on the stud 105 before mentioned. The inner edge of said lever is made to provide spaced teeth-like stop shoulders 117 for engagement by the lug or pin 106 before mentioned, on the wheel 83a. The top end of said member 115a has an adjustable stem connection 119 with the bottom end of a temperature responsive element 120. This element, which is in the form of a bi-metal bar, has its greater portion arranged within one of the toasting chambers or ovens and is secured at its top end to the wall 33a forming the front part of said chamber, as best appears in Fig. 2.

When the temperature in the said chamber or oven reaches the predetermined number of degrees, the member 120 tends to curve. This curving of said member through the connection 119, swings the member 115a counterclockwise, as viewed in Fig. 9, about its pivot 105. This pivot is so located with respect to the circle about which the pin 106 travels, that successive teeth will pass into said circle at different points thereon and provide a stop for said pin to limit the return movement of the wheel 83a and provide the next position from which it is to start. This determines the amount of movement of the timing wheel and regulates the amount of time required for subsequent toasting operations. Thus starting with a cold toaster, the first toasting operation will require the longest period of time. When the oven is once heated, the periods of time required for subsequent toasting operations become shorter. Starting with a cold toaster, the first toasting operation for example will take about 105 seconds, the next operation will take somewhat less time and so on until when the apparatus is in steady use the operation will take about 65 seconds.

Figure 14:
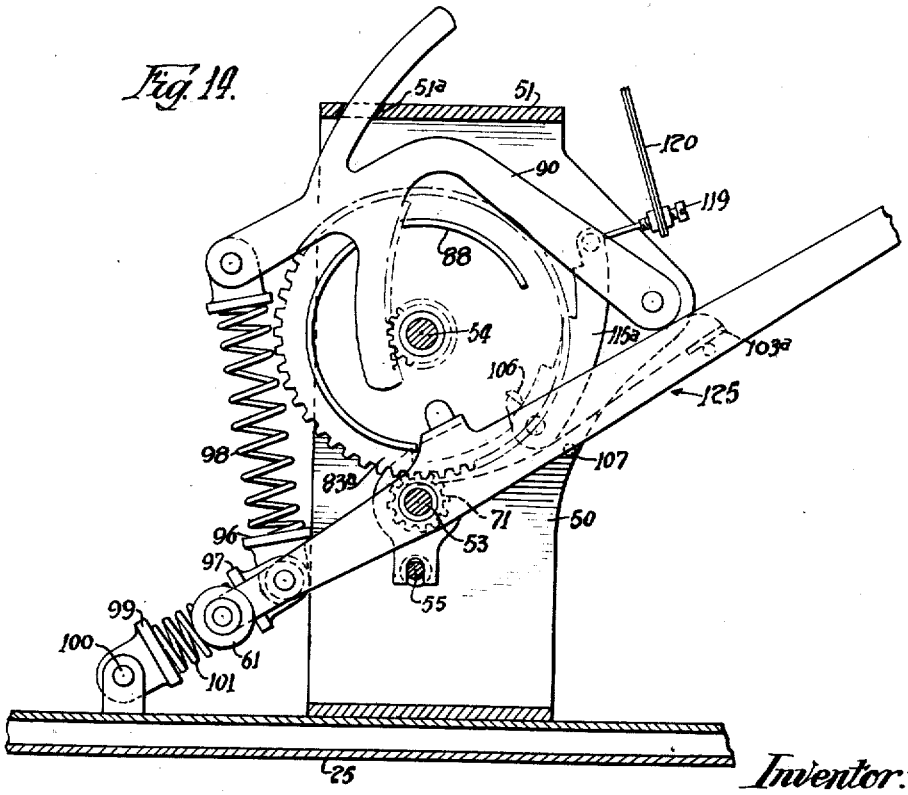
Fig. 14 is a view similar to Fig. 7 and illustrates a modified form of a part of the improved automatic bread toasting apparatus.

In Fig. 14 I have shown a slightly modified form of the invention wherein the long lever arm 56 and the short lever arm 57 are made integral as a single lever arm 125. Such a structure is operative for full automatic operation of the toaster apparatus and no locking and manual trip mechanism such as provided by the tubular member 113, the stem 114 and the latch lever 108 are employed in connection therewith.

In the operation of the toaster, assume that the bread supports 36 are in their bread receiving positions in the respective chambers or ovens as shown in full lines in Fig. 2. At this time, the lever arms 56 and 57 stand in full line positions shown in Figs. 2 and 9 and the contacts 63—64 of the heating element switch are separated or disengaged and the switch mechanism is open so that the heating elements 35 are deenergized. With the lever arms 56 and 57 in this position, the "high" parts of the cams 58 and 76 engage in the "low" parts of each other so that the spring 77 is functioning to hold the clutch teeth 72 of the pinion 71 out of engagement with the clutch 70 fixed to the shaft 53. The pinion 71 is then loose on the shaft 53. With the motor 80 connected up to a suitable source of electrical energy as through an associated switch (not shown), it drives the shaft 53 in one direction. As will be noticed from Fig. 9, the lever as constituted by the arms 56 and 57 is releasably locked in this position by reason of the over center lock as provided by the pivotal axis of the element 96 which is spaced below a plane or line 126 extending through the axes of the shaft 53 and the pivot or pin 100 for the element 99.

At this time the spring 101 is compressed or loaded and the extension or pin 56a of the lever arm 56 is in engagement with the extension 103a of the arm 103 of the lever 102 so that the other arm 104 stands in such position that its hook 104a is out of the circular path of the projection 106 of the timing wheel 83. Said projection 106 on the wheel 83 at this time is engaged with the bottommost shoulder or tooth 117 of the member 115 and the spring 98 is expanded and has raised the lever 90 to its highest position.

Figure 7:
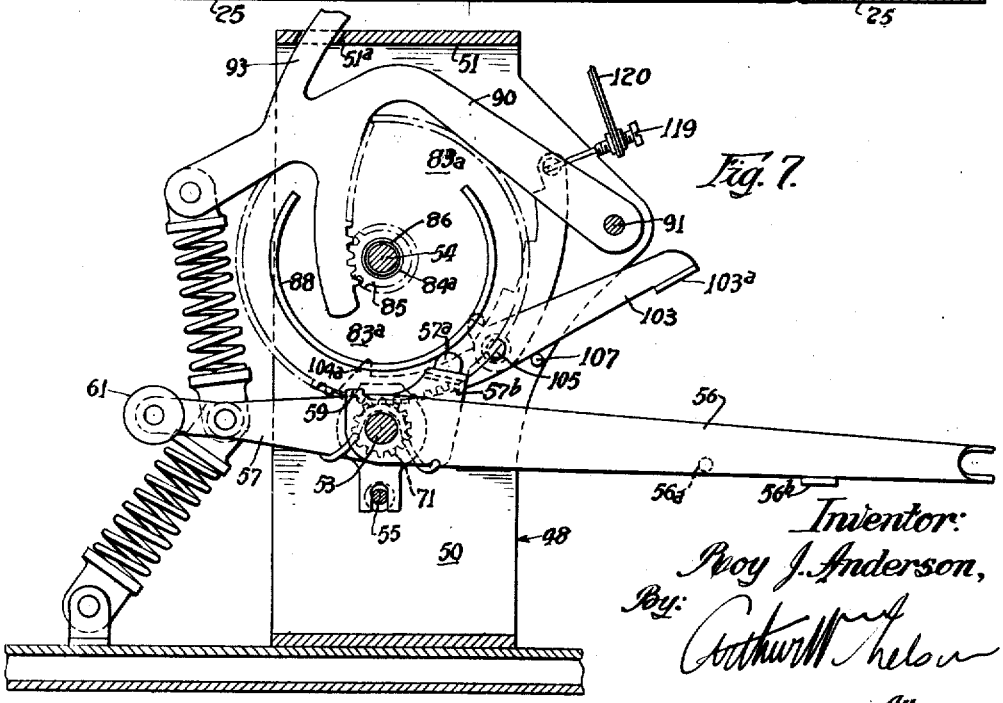
Fig. 7 is a detail vertical sectional view through a part of the timing mechanism as taken on the line 7—7 of Fig. 6.

Slices of bread may now be inserted through the bread slots 31 into the respective toasting chambers or ovens so as to engage or rest upon the bread supports 36 therein and which supports now stand in their bread receiving position. At this time, a considerable amount of the bread slices extend above the top wall 26 of the casing. By a mere touch or pressure of the operator's fingers upon one or both bread slices and due to the long leverage afforded by the lever arm, the lever arm 56 which is now loose on the shaft 53, turns thereon and through the spring 60 turns the lever arm 57 therewith so as to break the over center lock before mentioned, by swinging the pivot point for the element 97 upwardly through the plane or line 126. So soon as the over center lock has thus been broken, the spring 101 expands, to throw the arm 57 upwardly and through the overhanging extension 59, throw the arm 56 downwardly into the position shown in Fig. 7, the two arms moving as a single unit in this instance, to lower the bread supports 36 into bread toasting position in the respective toasting chambers or ovens. At this time, the bread slices 46 are disposed in full toasting relation with respect to the heating elements 35 in said chambers or ovens.

In the upward swing of the arm 57, the roller 61 at the free end thereof, engages the cushion spring 67 on the switch lever 65 and causes the contact 64 to engage the contact 63. This connects the heating elements 35 in the respective chambers or ovens to a source of electrical energy so that said elements are brought to incandescence to provide toasting heat in said chambers or ovens.

In the swinging movement of this lever arms 56—57 as a unit, the "high" part of the cam 58 on the lever arm 57 climbs the high part of the cam 76 associated with the pinion 71 and forces said pinion longitudinally of the shaft to bring the teeth 72 thereof into operative engagement with the clutch member 70 whereby the pinion is operatively connected to the shaft 53 to be driven thereby. The teeth of the pinion 71 are wider than the teeth of the timing wheel 83a which is in constant mesh therewith so that there is no demeshing between the wheel and pinion in the shifting movement of the pinion into and out of engagement with the clutch member. In the shifting movement of the pinion, the spring 77 is compressed to provide the energy for disengaging the pinion 71 from the clutch member 70 as will later appear.

Figure 9:
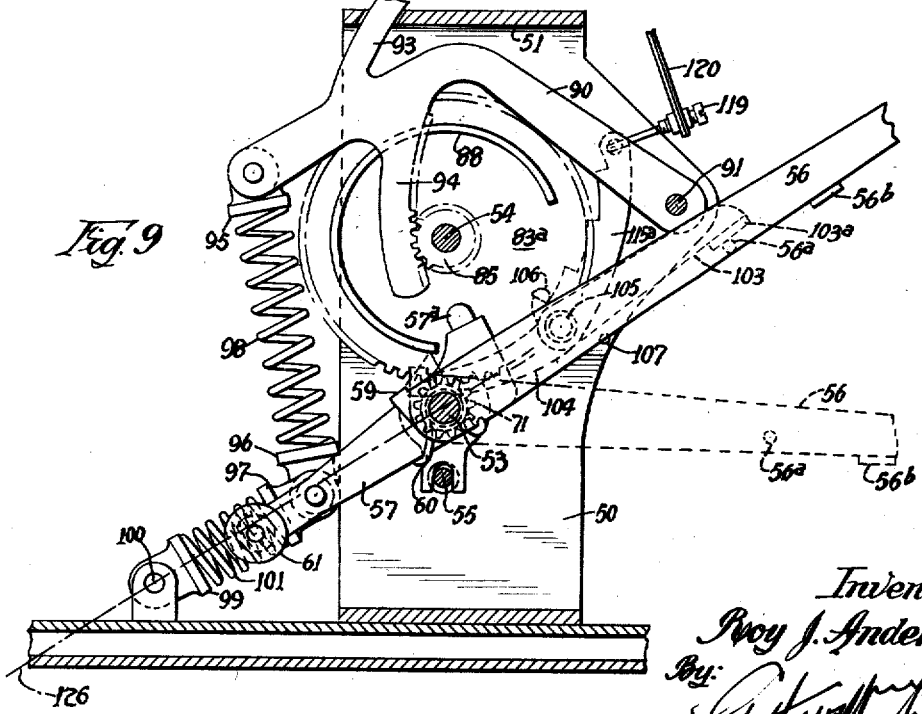
Fig. 9 is a view similar to Fig. 8 with certain of the parts in a further changed relation.

When the pinion 71 is driven by the shaft 53, the timing wheel 83a and its pinion 85 are driven by said pinion in a counter-clockwise direction when viewed as in Fig. 9. As the timing wheel is thus driven, the flange or shroud 88 turns toward and into engagement with the extension 57a of the lever arm 57 and this locks the lever arm against movement and the extension or pin 106 moves out of engagement with the step or shoulder of the heat responsive member 115a. In this movement of the timing wheel, the pinion 85 by reason of its engagement with the rack 94 of the lever 90, will swing said lever counter-clockwise and compress the spring 98 against the abutment 96 which is stationary at this time, due to the lever 57 being locked by the shroud 88.

When the trailing end of the shroud passes the extension 57a, the lever arm 57 is free to swing counter-clockwise under the action of the compressed or loaded spring 98, said spring at this time having a force overcoming that of the spring 101 so that the lever arm 57 is moved into its normal position wherein it is locked by the over center locking action as before described. In this position the "high" parts of the cam 58 will enter the "low" parts of the cam 76 when the spring 77 expands to act against the bracket 75 in a manner to cause the same to shift the pinion to the right when viewed in Fig. 11 and disconnect the pinion 71 from the clutch 70 so that the pinion is again loose with respect to the shaft 53.

In the driven movement of the wheel 83a, the pin 106 as it approaches the hook 104a of the lever 102, will ride past said hook to be engaged by said hook to hold the wheel against retrograde return movement until released by the lever arm 56 when it operates to return the bread supports to bread receiving position and which occurs automatically at the end of a bread toasting operation.

Should the latch lever 108 at this time be so set as to make it inoperative to engage the lever arm extension 56b, the lever arm 56 will of course, move with the lever arm 57 so that the arm 56 swings counter-clockwise as viewed in Fig. 2 to return the bread support 36 to its bread receiving position. At this time, the roller 61 moves out of engagement with the switch arm spring 57 so that the contacts 64—63 separate and the electrical energy is cut off from the heating elements. Also, at this time the top part of the finished toast may be grasped for removal. As the lever arms swing into this position, the pin or extension 56a thereon engages the extension 103a on the lever arm 103 and this swings said lever 102 counter-clockwise so that the hook 104a is withdrawn to release its locking engagement with the pin 106. The pinion 71 now being loose on the shaft 53, the spring 98 expands and returns to its normal condition, swinging the lever 90 clockwise. In this movement of the lever 90, it operates through the rack 94 and pinion 85 to return the timing wheel toward its next starting position as determined by the member 115a. By reason of the high temperature in the toasting chambers or ovens, after a toasting operation, the bi-metal bar 120 tends to curve and swing the member 115 counter-clockwise. This brings one of the teeth or shoulders of the member 115 into the circular path of the extension or pin 106 in its return movement to be stopped thereby. Thus the hotter the toasting chamber or oven, the less return movement of the timing wheel and the less time required for the next succeeding toasting operation.

Assume that it is desired to make the so-called "Melba" toast, which is a somewhat drier toast. Under such conditions, the tubular member 113 is turned to bring the high spot of its cam end 113*a* into engagement with the latch lever arm 111 so that the spring 112 throws said lever into a position wherein its hook 110*a* stands in the path of the extension 56*b* on the lever arm 56.

The bread to be toasted is then inserted into the bread slots 31 to engage on the bread supports 36 as before. A finger touch on the bread will release the arm 57 and cause the mechanism to function as before described so that the lever arms 56—57 swing clockwise to the position shown in Fig. 7. In this movement of said arms, the extension 56*b* engages the hook 110*a* of the latch lever 108 and swings the same counter-clockwise so that said extension may snap under the hook.

When in the operation of the timing mechanism, the lever arm 57 is returned to the position shown in Fig. 10, the lever arm 56 cannot move therewith because it has been locked by the latch 108. Thus, the bread supports are retained in toasting position in the respective chambers or ovens so that the bread is treated to the residual heat therein to dry out and brown to the desired color. When it is desired to make use of the toast, a slight touch or downward pressure on the knob 114*a* of the rod 114 will cause the latch 108 to swing into the full line position shown in Fig. 8. This removes the hook 110*a* from engagement with the extension 56*b* of the lever arm 56 so that the spring 60 operates to return the lever arm 56 to the position shown in Fig. 2 wherein the bread supports 36 are in their bread receiving position for the removal of the finished toast.

When it is desired that the mechanism operate automatically to return the bread supports to the bread receiving position after each toasting operation, the tubular member 113 is turned to bring the "low" part of its bottom cam end 113*a* into engagement with the arm 111 of the latch 108 and this locks the latch in a position wherein it is inoperative to hold the lever arm 56 against return movement so that said arm is free to move with the arm 57.

When the arms 56—57 are made as an integral unit 125, as in Fig. 14, the use of the latch 108 is unnecessary, the mechanism thus functioning automatically to return the bread supports to bread receiving position at the end of each toasting operation.

By reason of the construction described, it is apparent that power means is employed to move the bread supports from bread receiving to bread toasting position but this means is held out of operation by releasable means which require manual operation for release purposes. This releasable means, though positive in operation, is quite sensitive so that the touch of the finger releases the same and the power means then functions for its intended purpose. Therefore, the control for the toaster mechanism is a finger touch control. Thus, no tiresome strain is imposed upon the operator as there are no stiff spring pressures to overcome by muscular action on the part of the operator.

Should it be desired to add sections to the one already installed, it is only necessary to install the same in place and hook the shaft 53 thereof into operative connection with the shaft of the section now in place. Thus the one motor 80 may drive several sections. By reason of the construction described, the top of the sections may be made flush with the top of the counter or other support in which said sections are installed.

The word "bread" as used herein is to be considered in its broadest sense and to include coffee cake, crackers and like products capable of being toasted in the apparatus.

While in describing the invention, I have referred in detail to the form, and arrangement of the parts, as well as their coaction, the same is to be considered only in the illustrative sense so that I do not wish to be limited thereto except as may be specifically pointed out in the appended claims.

I claim:

1. Toasting apparatus embodying therein means providing a source of heat, means for controlling said source of heat as to its being "on" or "off," bread supporting means movable with respect to said source of heat from a bread receiving position to a bread toasting position, a power driven shaft, means adapted to be connected to said shaft so as to be operative to move said bread supporting means from said bread receiving position to said bread toasting position, manually releasable means for holding said connecting means disconnected from said shaft, said connecting means being actuated by said power shaft when connected thereto for moving said bread supporting means from its bread receiving position to its bread toasting position and for actuating said controlling means to provide the "on" condition for said source of heat and for controlling the period of time said bread supporting means remains in its toasting position, and means operating automatically through said connecting means at the expiration of said period of time to move said bread supporting means back to its bread receiving position and to actuate said controlling means to provide the "off" condition for said source of heat.

2. Toasting apparatus embodying therein means providing a source of heat, means for controlling said source of heat, bread supporting means movable with respect to said source of heat from a bread receiving position to a bread toasting position, a power driven shaft, means adapted to be connected to said shaft so as to be operative to move said bread supporting means from said bread receiving position to said bread supporting position and to actuate said controlling means for said source of heat, manually releasable means for holding said connecting means disconnected from said shaft, said connecting means actuated by said shaft when connected thereto for moving said supporting means from its bread receiving position to its bread toasting position and for holding said bread supporting means in its toasting position for a predetermined period of time, means responsive to temperature conditions of said source of heat for controlling the period of time said bread receiving means remains in its toasting position, and means operative through said connecting means at the expiration of said period of time to move said bread supporting means back to its bread receiving position.

3. Toasting apparatus embodying therein means providing a source of heat, bread supporting means, power means operative to move said first two mentioned means relatively to provide a bread receiving position and a bread toasting position for said bread supporting means, releasable means for holding said power means against operation, and means operating upon a downward manual pressure on the bread when said bread supporting means is in its bread receiving position to actuate said releasable means to release said power means to move said two first mentioned means relatively to provide the bread toasting position for said bread supporting member.

4. Toasting apparatus embodying therein means providing a source of heat, bread supporting means movable with respect to said source of heat from a bread receiving position to a bread toasting position, power means normally disconnected from but operable to move said bread supporting means from its bread receiving position to the bread toasting position, releasable means for holding said power means against operation, and means operating upon a downward manual pressure on the bread when said bread receiving means is in its bread receiving position to actuate said releasable means to release said power means to move said bread supporting means into its toasting position.

5. Toasting apparatus embodying therein means providing a source of heat, means for controlling said heating means as to its being "on" or "off," bread supporting means movable with respect to said source of heat from a bread receiving position to a bread toasting position, releasable means for holding said power means against operation and for holding said heat source controlling means in its "off" condition, and means operating upon a downward manual pressure on the bread when said bread supporting means is in its bread receiving position to actuate said releasable means to release said power means to move said bread supporting means from its bread receiving position to toasting position and for actuating said controlling means to provide the "on" condition for said source of heat.

6. Toasting apparatus embodying therein means providing a source of heat, bread supporting means, a power driven rotary member, means operative when connected to said member for moving said first two mentioned means relatively to provide a bread receiving position and a bread toasting position for said bread supporting means, and means operable through a pressure imposed manually to the bread to be toasted for connecting said third mentioned means to said member.

7. Toasting apparatus embodying therein means providing a source of heat, bread supporting means movable with respect to said source of heat from a bread receiving position to a bread toasting position, a power driven rotary member, means operative when connected to said member to move said bread supporting means from the bread receiving position to the bread toasting position, and means operable through a pressure imposed manually to the bread to be toasted for connecting said third mentioned means to said member.

8. Toasting apparatus embodying therein means providing a source of heat, means for controlling said source of heat as to its being "on" or "off," bread supporting means movable with respect to said source of heat from a bread receiving position to a bread toasting position, a power driven rotary member, means operative when connected to said member to move said bread supporting means from said bread receiving position to said bread toasting position and to actuate said controlling means to provide the "on" condition for said source of heat, and means operable through a pressure imposed manually to the bread to be toasted for connecting said fourth mentioned means to said member.

9. Toasting apparatus embodying therein means providing a source of heat, bread supporting means movable with respect to said source of heat from a bread receiving position to a bread toasting position, a power driven rotary member, means operative when connected to said member to move the bread supporting means from the bread receiving position to the bread toasting position, means operable through a pressure imposed manually to the bread to be toasted for connecting said third mentioned means to said member so as to move the bread supporting means from the bread receiving position into the bread toasting position, means for holding said bread supporting means in said bread toasting position for the desired period of time, and means operating automatically at the expiration of said period of time for moving said bread supporting means back to said bread receiving position.

10. Toasting apparatus embodying therein, means providing a source of heat, bread supporting means movable with respect to said source of heat from a bread receiving position to a bread toasting position, a power driven rotary member, a lever-like actuating member for said bread supporting member for moving the same from one position to the other, and means operable upon the imposition of a pressure on said leverlike actuating member for operatively connecting said lever-like actuating member to said rotary member.

11. Toasting apparatus embodying therein, means providing a source of heat, means for controlling said source of heat as to its "off" and "on" conditions, bread supporting means movable with respect to said source of heat from a bread receiving position to a bread toasting position, a power driven rotary member, a lever-like actuating member for moving the bread supporting means from one position to the other, and means operable upon the imposition of a pressure on said lever-like actuating member for operatively connecting the same to said rotative member and for actuating said controlling means for said source of heat to bring the latter into its "on" position.

12. Toasting apparatus embodying therein means providing a source of heat, bread supporting means movable with respect to said source of heat from a bread receiving position to a bread toasting position, a power driven rotary member, a lever arm pivoted coaxially with respect to the axis of said member and also operatively connected to said bread supporting means, and means operative in the manual imposition of a pressure upon said lever arm for operatively connecting it to said rotative member.

13. Toasting apparatus embodying therein means providing a source of heat, means for controlling said source of heat as to the "on" and "off" condition thereof, bread supporting means movable with respect to said source of heat from a bread receiving position to a bread toasting position, a power driven rotary member, means providing a lever pivoted coaxially with respect to the axis of said member and comprising arms, one of which is operatively connected to said bread supporting means and the other of which is associated with said heat controlling means, and means operative upon the imposition of a pressure upon the first mentioned arm of said lever for connecting said lever to said member to be actuated thereby to move said bread supporting means from said bread receiving position into said bread toasting position, said other arm of said lever operating upon said controlling means for providing the "on" condition for said source of heat.

14. Toasting apparatus embodying therein means providing a source of heat, bread supporting means movable with respect to said source of heat from a bread receiving position to a bread toasting position, a power driven rotary member, means providing a lever mounted coaxially with said member but normally disconnected therefrom, means for operatively connecting a part of said lever to said bread supporting means, means requiring manual operation for operatively connecting said lever to said member so that said lever moves said bread supporting means into said toasting position, timing means for holding said supporting means in toasting position for the desired period of time, means capable of storing power and actuated from said rotative member and connected to said lever for returning said supporting means to said bread receiving power, and means operating automatically to release said stored power and to disconnect said lever from said member so that said stored power operates to return said supporting means to its bread receiving position.

15. In a toaster apparatus, a shaft adapted to be driven in one direction, means providing a lever mounted on said shaft and normally loose therefrom and normally arranged in a certain position, a member loose on said shaft, a second member driven from said first member, means operative in the manual depression of said lever for connecting said first member in driving relation with the shaft to move said lever in one direction to a second position, means operative through said second member for holding said lever in said second position for a predetermined amount of movement of said second member and then operating to release said lever, and power storage means connected to said lever and actuated from said second member to store up power in said movement of said second member up to the release of said lever, said stored up power in the release of said lever operating to return the same to the first mentioned position.

16. In a toaster apparatus, a shaft adapted to be driven in one direction, means providing a lever mounted on said shaft, and normally loose therefrom and normally arranged in a certain position, means providing an over center spring mechanism for releasably holding said lever in said certain position, a member loose on said shaft, a second member driven from said first member, means operative in the manual depression of said lever for breaking said over center spring mechanism and for connecting said first member in driving relation with said shaft to move said lever in one direction to a second position, means operative through said second member for holding said lever in said second position for a predetermined amount of movement of said second member and then operating to release said lever, and power storage means connected to said lever and actuated from said second member to store up power in said movement of said second member up to the release of said lever, said stored up power in the release of said lever operating to return the same to said first mentioned position.

17. In a toasting apparatus, a shaft adapted to be driven in one direction, means providing a lever mounted on said shaft and normally loose therefrom and normally arranged in a certain position, said lever including a long arm and a short arm, a member loose in said shaft, a second member driven from said first member, means operable in the manual depression of said long arm of the lever for connecting the first member in driving relation to the shaft to move said lever in one direction to a second position, means operative through said second member for holding said lever in said second position for a predetermined amount of movement of said second member and then operating to release said lever, and power storage means connected to the short arm of said lever and actuated from said second member to store up power in said movement of said second member up to the release of said lever, said stored up power in the release of said lever operating to return the same to said first mentioned position.

18. In a toasting apparatus, a shaft adapted to be driven in one direction, means providing a lever mounted on said shaft and normally loose therefrom and normally arranged in a certain position, said lever including a long arm and a short arm, a member loose in said shaft, a second member driven from said long arm of the lever for connecting the first member in driving relation to the shaft to move said lever in one direction to a second position, means operative through said second member for holding said lever in said second position for a predetermined amount of movement of said second member and then operating to release said lever, a power spring engaged with the short arm of said lever, a second and pivoted lever connected to said spring and actuated from said second member in its movement to compress and store up power in said spring, up to the release of said first mentioned lever, said stored up power in the release of said lever operating to return said lever to said first mentioned position.

19. Toasting apparatus embodying therein means providing a source of heat, bread supporting means movable with respect to said source of heat from a bread receiving position to a toasting position, power means, means operative when connected to said power means for moving said bread supporting means from said bread receiving position to said bread toasting position, said fourth mentioned means including a part requiring manual operation for connecting the same to said power means, means operating automatically after said supporting means has been in said toasting position for the desired period of time for returning it to said bread receiving position, manually operative means operating through said part of said fourth mentioned means for holding said supporting means in said toasting position against the action of said automatically operating means, and other manually operative means also operating through said part of said fourth mentioned means for releasing said bread supporting means from its toasting position for the return thereof to its bread receiving position.

20. Toasting apparatus embodying therein means providing a source of heat, bread supporting means movable with respect to said source of heat from a bread receiving position to a toasting position, power means operative to move said bread supporting means from said bread receiving means to said bread toasting position, means operating automatically after said supporting means has been in said bread toasting position for the desired period of time for returning it to said bread receiving position, means operable to be set so as to automatically lock said bread supporting means in said toasting position against the action of said means operating automatically to return said supporting means to said bread receiving position, and manually operable means for releasing said automatic locking means to permit the return of said supporting means to said bread receiving position.

21. A toasting apparatus embodying therein a plurality of toasting sections arranged side by side, means providing a source of heat for each toaster section, a bread supporting means in each section and movable from a bread receiving position to a toasting position, means in each section and including a shaft for moving said bread supporting means from one position to the other and back to the first position, means for connecting the shaft in one section to the shaft in another section, and means for driving only the shaft in one of said sections.

22. A toasting apparatus embodying therein a plurality of toasting sections arranged side by side, means providing a source of heat for each toaster section, a bread supporting means in each section and movable from a bread receiving position to a toasting position, means in each section and including a shaft for moving said supporting means from one position to the other and back to the first position, the ends of the shafts in adjacent sections being formed for interengaging driving connection, and a motor associated with only one of said sections for driving the shaft therein.

ROY J. ANDERSON.

Certificate of Correction

Reissue Patent No. 22,781. August 20, 1946.

ROY J. ANDERSON

It is hereby certified that the name of the assignee in the above numbered patent was erroneously described and specified as "Chicago Flexible Shaft Company" whereas said name should have been described and specified as *Sunbeam Corporation*, as shown by the record of assignments in this Office; and that the said Letters Patent should be read with this correction therein that the same may conform to the record of the case in the Patent Office.

Signed and sealed this 12th day of November, A. D. 1946.

[SEAL]

LESLIE FRAZER,
*First Assistant Commissioner of Patents.*